(12) United States Patent
Mattson et al.

(10) Patent No.: US 9,141,731 B2
(45) Date of Patent: Sep. 22, 2015

(54) SYMMETRY OF DISCOVERED GEOMETRIC RELATIONSHIPS IN A THREE DIMENSIONAL MODEL

(75) Inventors: Howard Charles Duncan Mattson, Cambridge (GB); Douglas Joseph King, Peterborough (GB); Yanong Zhu, Cambridge (GB)

(73) Assignee: Siemens Product Lifecycle Management Software Inc., Plano, TX (US)

( * ) Notice: Subject to any disclaimer, the term of this patent is extended or adjusted under 35 U.S.C. 154(b) by 581 days.

(21) Appl. No.: 13/529,066

(22) Filed: Jun. 21, 2012

(65) Prior Publication Data

US 2013/0346029 A1    Dec. 26, 2013

(51) Int. Cl.
*G06G 7/48* (2006.01)
*G06F 17/50* (2006.01)

(52) U.S. Cl.
CPC ............ *G06F 17/50* (2013.01); *G06F 2217/06* (2013.01)

(58) Field of Classification Search
CPC ........... G06T 5/00; G06T 17/00; G06F 17/50; G06F 19/00; G09G 5/00; H04N 13/02; G06K 9/00
See application file for complete search history.

(56) References Cited

U.S. PATENT DOCUMENTS

| | | | | |
|---|---|---|---|---|
| 5,936,628 A * | 8/1999 | Kitamura et al. | ............. | 345/420 |
| 6,844,877 B1 * | 1/2005 | Rajkumar et al. | ............. | 345/420 |
| 7,075,531 B1 * | 7/2006 | Ando et al. | ................... | 345/420 |
| 2002/0097906 A1 * | 7/2002 | Ishiyama | ...................... | 382/154 |
| 2008/0269942 A1 * | 10/2008 | Free | .............................. | 700/182 |
| 2012/0075433 A1 * | 3/2012 | Tatzgern et al. | ................ | 348/50 |
| 2012/0078588 A1 * | 3/2012 | McDaniel | ......................... | 703/1 |
| 2012/0109591 A1 | 5/2012 | Thompson et al. | | |

OTHER PUBLICATIONS

Szakal et al., The Symmetry-diagram as a Tool of the Pattern Recognition, International Journal of Mathematical Models and Methods in Applied Sciences, Issue 4, vol. 2, 2008.*
Notification of Transmittal of the Intl. Search Report and Written Opinion of the Intl. Searching Authority, or the Declaration for PCT/US2013/046701 dated Oct. 2, 2013, 16 pgs.
Li, M. et al. "Detecting design intent in approximate CAD models using symmetry", Computer Aided Design, Elsevier Publishers, vol. 42, Mar. 2010, 19 pgs.
Chang, M. et al. "Reverse engineering of a symmetric object", Computers & Industrial Engineering, Pergamon, vol. 55(2), Sep. 1, 2008, 10 pgs.
Langbein, F.C. et al. "Recognizing geometric patterns for beautification of reconstructed solid models", Shape Modeling & Applications, SMI 2001 Int'l Conf., May 7, 2001, 10 pgs.

* cited by examiner

*Primary Examiner* — Kandasamy Thangavelu (57) ABSTRACT

Systems and methods for identifying symmetry relationships in product data management (PDM) systems. A method includes receiving a 3D model including a plurality of components and identifying a plurality of target components from the plurality of components. The method includes identifying a symmetry plane in the 3D model and determining the location of each of the target components with respect to the symmetry plane. The method includes adding the target components to respective groups according to the determined locations, and creating an equivalence class for each group of target components. The method includes storing a symmetry relationship between the created equivalence classes.

20 Claims, 11 Drawing Sheets

| | P1 |
|---|---|
| c0 | -1 |
| c1 | -1 |
| c2 | -1 |
| c3 | +1 |
| c4 | +1 |

SENSES

FIG. 10C

Identical: On
Symmetry: On

|    | P1 | P2 |
|----|----|----|
| c1 | -1 | +1 |
| c2 | -1 | -1 |
| c3 | +1 | +1 |
| c4 | +1 | -1 |

SENSES

*FIG. 11C*

SYMMETRY OF DISCOVERED GEOMETRIC RELATIONSHIPS IN A THREE DIMENSIONAL MODEL

CROSS-REFERENCE TO OTHER APPLICATION

This application has some subject matter in common with U.S. patent application Ser. No. 13/529,061, filed concurrently herewith, for "Representation and Discovery of Geometric Relationships in a Three-Dimensional Model", which is hereby incorporated by reference.

TECHNICAL FIELD

The present disclosure is directed, in general, to computer-aided design, visualization, and manufacturing systems, product lifecycle management ("PLM") systems, and similar systems, that manage data for products and other items (collectively, "Product Data Management" systems or "PDM" systems).

BACKGROUND OF THE DISCLOSURE

PDM systems manage PLM and other data. Improved systems are desirable.

SUMMARY OF THE DISCLOSURE

Various disclosed embodiments include systems and methods for improved PDM processes, including systems and methods for managing symmetry within discovered geometric relationships in a three dimensional model in product data management (PDM) systems. A method includes receiving a 3D model including a plurality of components and identifying a plurality of target components from the plurality of components. The method includes identifying a symmetry plane in the 3D model and determining the location of each of the target components with respect to the symmetry plane. The method includes adding the target components to respective groups according to the determined locations and creating an equivalence class for each group of target components. The method includes storing a symmetry relationship between the created equivalence classes.

The foregoing has outlined rather broadly the features and technical advantages of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiment disclosed as a basis for modifying or designing other structures for carrying out the same purposes of the present disclosure. Those skilled in the art will also realize that such equivalent constructions do not depart from the spirit and scope of the disclosure in its broadest form.

Before undertaking the DETAILED DESCRIPTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which.

DETAILED DESCRIPTION

FIGS. 1 through 11, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device. The numerous innovative teachings of the present application will be described with reference to exemplary non-limiting embodiments.

Geometric relationship recognition allows users to edit models while retaining important design features, even on non-native or imported models.

Given any three-dimensional (3D) CAD model, there are many geometric relationships that the user may wish to keep when edits are made. For example, the user may wish to maintain certain distances between two features, for features to be "mirrored" or symmetrical about an arbitrary line or plane, for features to be maintained as parallel, or otherwise. After such relationships are discovered in a model, symmetry relationships may require special consideration. Disclosed embodiments include systems and method for processing discovered symmetry relationships.

Figure 1:
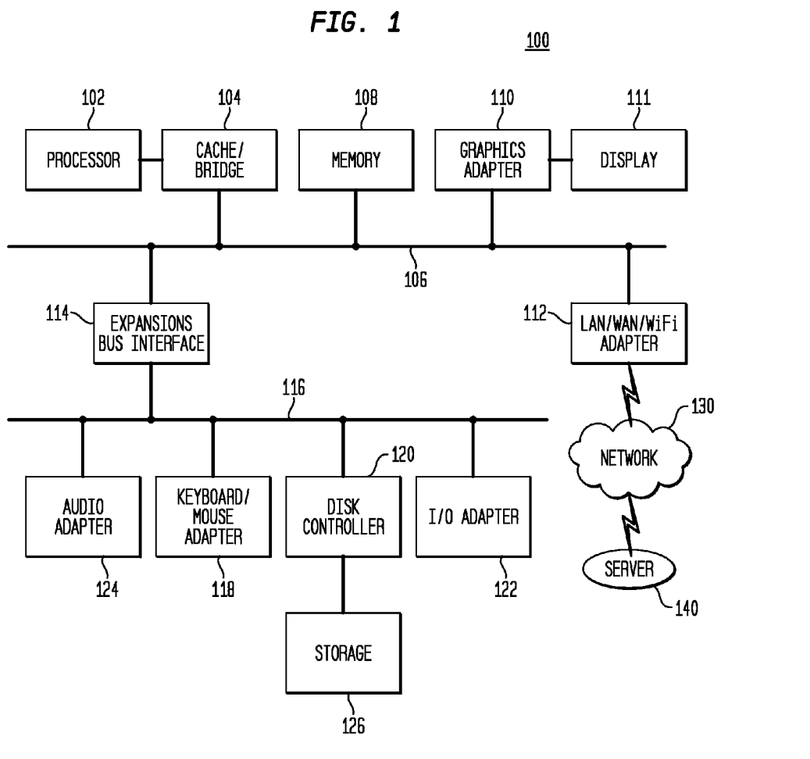
FIG. 1 depicts a block diagram of a data processing system in which an embodiment can be implemented.

FIG. 1 depicts a block diagram of a data processing system in which an embodiment can be implemented, for example as a PDM system or clearance system particularly configured by software or otherwise to perform the processes as described herein, and in particular as each one of a plurality of interconnected and communicating systems as described herein. The data processing system depicted includes a processor 102 connected to a level two cache/bridge 104, which is connected in turn to a local system bus 106. Local system bus 106 may be, for example, a peripheral component interconnect (PCI) architecture bus. Also connected to local system bus in the depicted example are a main memory 108 and a graphics adapter 110. The graphics adapter 110 may be connected to display 111.

Other peripherals, such as local area network (LAN)/Wide Area Network/Wireless (e.g. WiFi) adapter 112, may also be connected to local system bus 106. Expansion bus interface 114 connects local system bus 106 to input/output (I/O) bus 116. I/O bus 116 is connected to keyboard/mouse adapter 118, disk controller 120, and I/O adapter 122. Disk controller 120 can be connected to a storage 126, which can be any suitable machine usable or machine readable storage medium, including but not limited to nonvolatile, hard-coded type mediums such as read only memories (ROMs) or erasable, electrically programmable read only memories (EEPROMs), magnetic tape storage, and user-recordable type mediums such as floppy disks, hard disk drives and compact disk read only memories (CD-ROMs) or digital versatile disks (DVDs), and other known optical, electrical, or magnetic storage devices.

Also connected to I/O bus 116 in the example shown is audio adapter 124, to which speakers (not shown) may be connected for playing sounds. Keyboard/mouse adapter 118 provides a connection for a pointing device (not shown), such as a mouse, trackball, trackpointer, etc.

Those of ordinary skill in the art will appreciate that the hardware depicted in FIG. 1 may vary for particular implementations. For example, other peripheral devices, such as an optical disk drive and the like, also may be used in addition or in place of the hardware depicted. The depicted example is provided for the purpose of explanation only and is not meant to imply architectural limitations with respect to the present disclosure.

A data processing system in accordance with an embodiment of the present disclosure includes an operating system employing a graphical user interface. The operating system permits multiple display windows to be presented in the graphical user interface simultaneously, with each display window providing an interface to a different application or to a different instance of the same application. A cursor in the graphical user interface may be manipulated by a user through the pointing device. The position of the cursor may be changed and/or an event, such as clicking a mouse button, generated to actuate a desired response.

One of various commercial operating systems, such as a version of Microsoft Windows™, a product of Microsoft Corporation located in Redmond, Wash. may be employed if suitably modified. The operating system is modified or created in accordance with the present disclosure as described.

LAN/WAN/Wireless adapter 112 can be connected to a network 130 (not a part of data processing system 100), which can be any public or private data processing system network or combination of networks, as known to those of skill in the art, including the Internet. Data processing system 100 can communicate over network 130 with server system 140, which is also not part of data processing system 100, but can be implemented, for example, as a separate data processing system 100.

The mathematical definition of an equivalence class ("EC"), as used herein, is a set of members that share an equivalence relation. Equivalence relations are reflective, symmetric, and transitive. Equivalence classes have the useful property that an element may only be a member of one equivalence class defined by a particular equivalence relation.

Equivalence classes can therefore be used to define geometric relationships within a CAD model where those relationships are equivalence relations.

Equivalence relations exist in a model where geometries share at least one equal equivalence component; the equivalence components for an equivalence relation are center, axis, plane, direction, radius, minor radius, or half angle.

The following equivalence relations are of use in geometric modeling according to disclosed techniques:

Identical (I): Geometries share the same type and all equivalence components.

Same center (SC): Geometries share the same center equivalence component.

Same axis (SA): Geometries share the same axis equivalence component.

Same plane (SP): Geometries share the same plane equivalence component.

Same shape (SS): Geometries that share the same type, and same radius, major and minor radii, or half angle equivalence component.

Same direction (SD): Geometries share the same direction equivalence component, aligned or anti-aligned.

From these equivalence relations, classes containing geometries can be formed that share the same equivalence relation.

Many models are constructed to be symmetric across a given plane and it is desirable to discover and keep these symmetries when editing such models. Symmetric entities within the model are also often part of other geometrically true conditions that are discovered simultaneously with the symmetry. Very often enforcing these additional conditions will restrict the edits a user can perform.

Figure 2A:
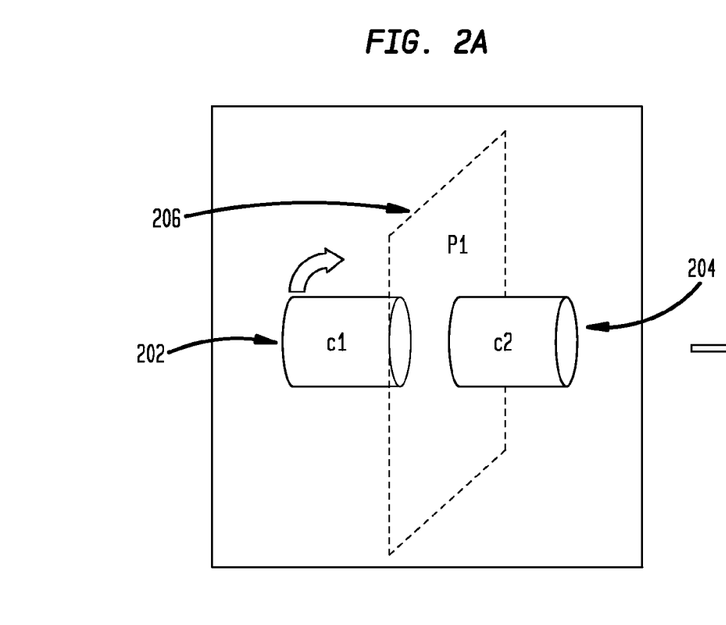
FIGS. 2A and 2B show examples of symmetric entities in accordance with disclosed embodiments.
Figure 2B:
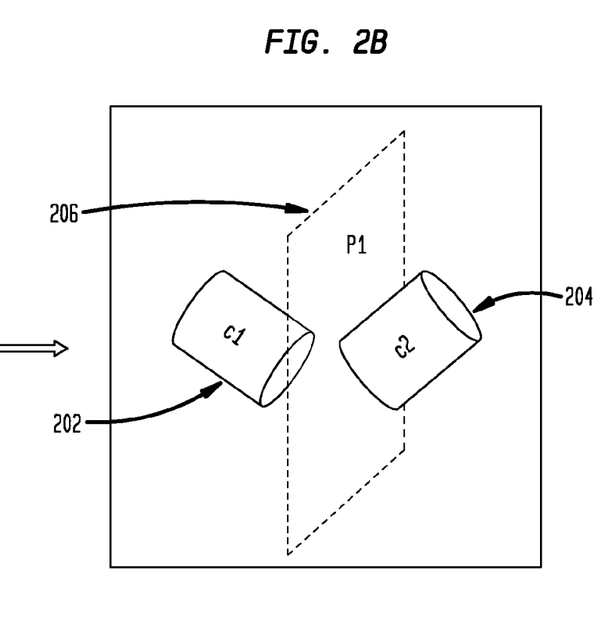

FIGS. 2A and 2B show examples of symmetric entities. In FIG. 2A, the model cylindrical face c1 202 is both symmetric with face c2 204 via plane P1 206 and also identical (geometrically) to c2. Keeping c1 202 and c2 204 identical would not allow c1 202 to be rotated as shown in FIG. 2B.

There is a hierarchical structure among these equivalence classes, as listed above, with Identical being the lowest, then Same-centre, Same-axis, Same-plane, and Same-shape, and finally Same-direction at the top.

In various embodiments, the hierarchical structure among the equivalence classes can have one or more of the following features:

The relationship defined in a lower level class implies higher level class relations, but these relationships are not specifically represented. For example, two planes that are Identical are also Same-plane and Same-direction.

The directed edge from node A to node B can be interpreted as 'B is a member of A' or 'A is a parent of B'.

The terminal nodes of the graph (i.e. the members of the Identical class) are made up of model geometries.

Each terminal node must belong to one and only one Identical class node.

Each class node may belong to multiple equivalence classes with distinctive types, but it can only belong to one class of a certain type.

A product assembly may include multiple basic 3D components, each of which may share various equivalence relations. Each of these assemblies can be represented by a connected graph that shows the equivalence relations between each component type.

Where the preservation of symmetry conditions is requested, and these are present in the model, the symmetry relationships are preferred over other relationships. This preference for symmetry is applied to all relationship conditions discovered in the model. The symmetry relationship described herein is not part of the equivalence class hierarchy described above, since symmetric components often do not have equivalence; for example, symmetric components may not be in the same direction.

Geometric relationships are discovered and stored making use of the mathematical concept of equivalence classes to represent equivalence geometric relationships in the model. Non-equivalence relationships are then formed between these classes. This representation ensures a complete but compact representation and also allows for efficient discovery.

Figure 3A:
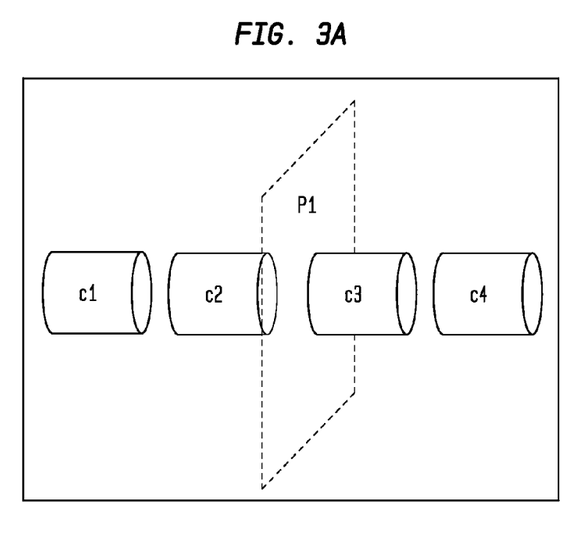
FIG. 3A shows a simple example representation if a model to illustrate symmetry relationship.
Figure 3B:
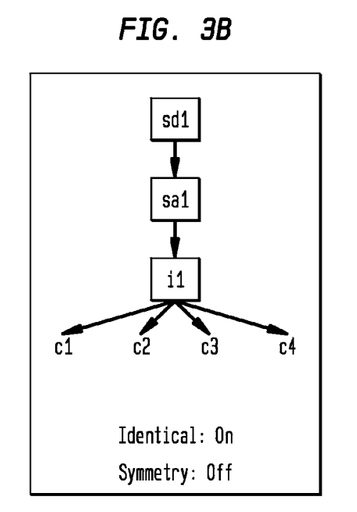
FIGS. 3B and 3C illustrate geometric relationship graphs corresponding to FIG. 3A, all in accordance with disclosed embodiments.
Figure 3C:
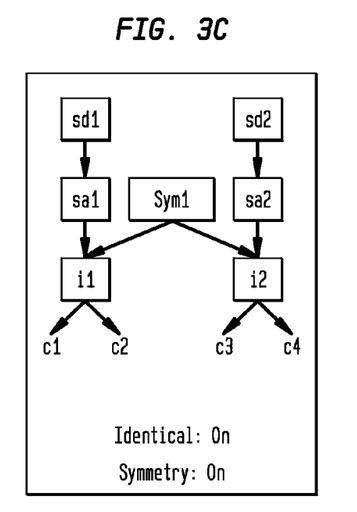

FIG. 3A shows a simple example representation of a model to illustrate symmetry relationship, and FIGS. 3B and 3C illustrate geometric relationship graphs corresponding to FIG. 3A.

FIG. 3A shows cylinders c1, c2, c3, and c4, two on each side of plane p1. FIG. 3B shows a relationship graph indicating that c1, c2, c3, and c4 are part of the same Identical class i1, the same Same-axis class sa1, and the same Same-direction class sd1. FIG. 3B shows the relationship graph with Identical class discovery switched on and Symmetry relation discovery switched off.

As can be seen from FIG. 3A, if symmetry across plane P1 is to be persevered when rotating one of the cylinder axes, then the Identical class i1 must be split into two classes, one containing c1 and c2 and the other containing c3 and c4. That is, if one cylinder axis is rotated, then at least the corresponding/opposite cylinder axis on the other side of plane P1 must also be rotated in the opposite direction. Assuming c1 and c2 stay identical, and c3 and c4 stay identical, the Identical class i1 shown in FIG. 3B must be split into two Identical classes i1 and i2, as shown in FIG. 3C.

This division must also be propagated to the Same-axis and Same-direction classes above i1/i2 to produce a structure as shown in FIG. 3C, with the symmetry then applied between the two Identical classes. FIG. 3B shows the relationship graph with discovery of Identical classes and Symmetry relations on.

This split of the complete class hierarchy allows a user to move or rotate any of the cylinders and the system will modify/move and display the other faces accordingly.

Figure 4A:
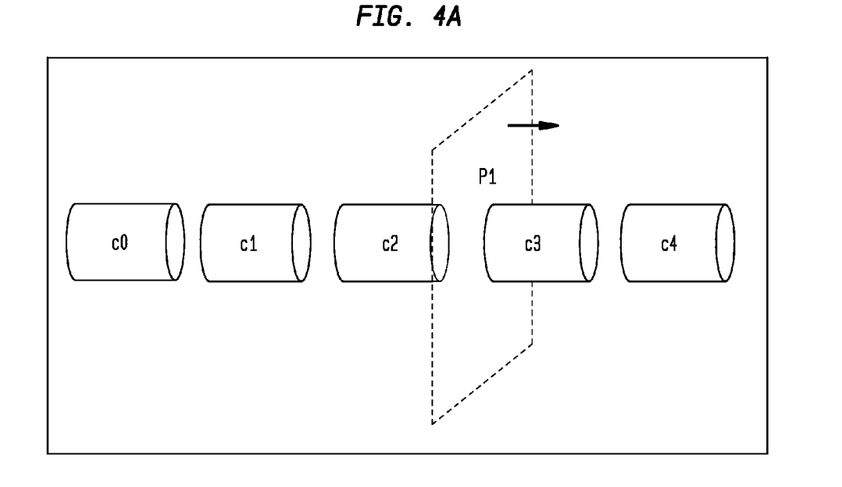
FIG. 4A shows an example of a model wherein a first Identical class has three members but a second Identical class contains only two.

Many classes will not contain a completely symmetric set of members. FIG. 4A shows an example of a model wherein Identical class i1 has three members but Identical class i2 contains only two, as shown in the geometric relationship graph of FIG. 4B.

Figure 4B:
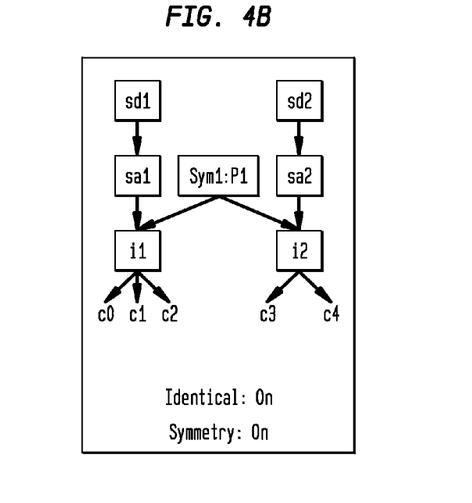
FIG. 4B shows a corresponding geometric relationship graph, both in accordance with disclosed embodiments.

In this case, the structure is still split by the symmetry plane P1, but not evenly as in the first example, so that cylinders c0, c1, and c2 are part of Identical class i1, and cylinders c3 and c4 are part of Identical class i2. The symmetry relationship is shown as Sym1:P1, indicating symmetry relationship 1 with respect to symmetry plane P1.

This process of splitting the classes in the structure is referred to herein as "partitioning." Partitioning can be triggered by examining all members of a relationship to determine if any two members are symmetric. If any are symmetric, then a class can be partitioned using a process as described below.

Figure 5:
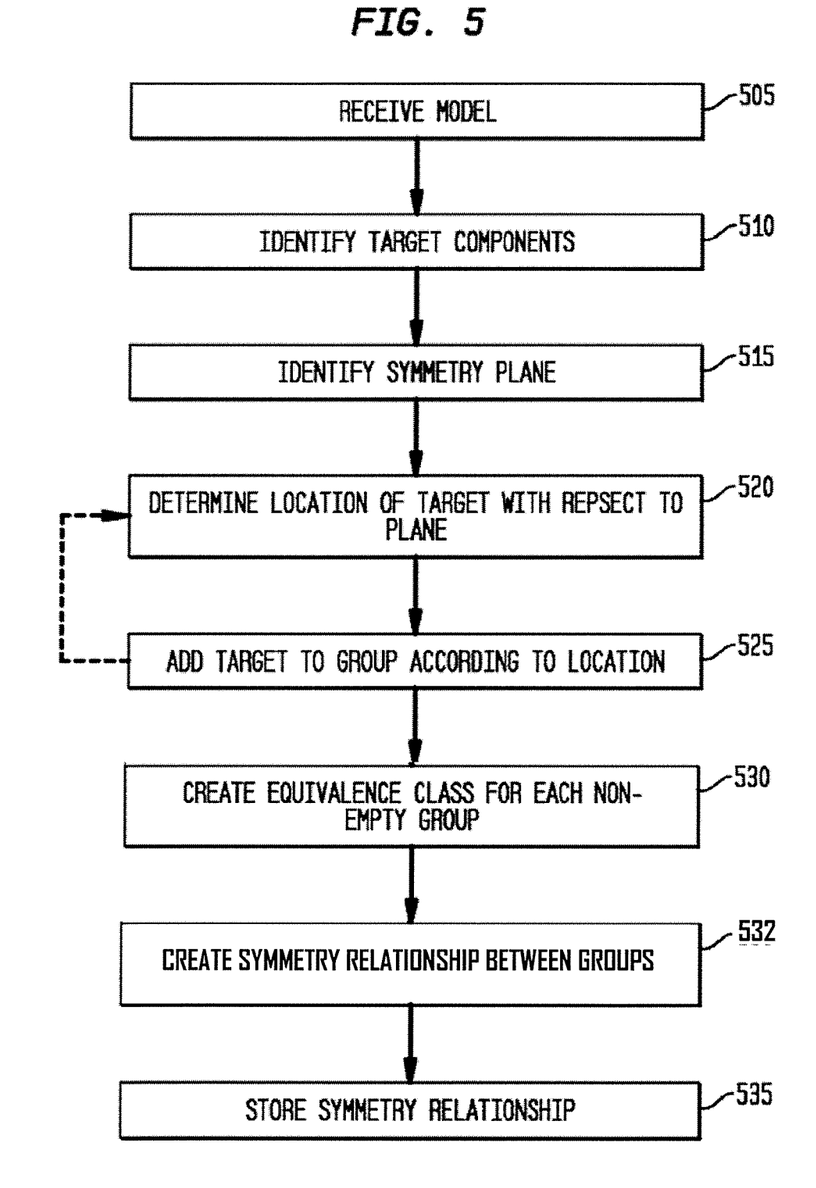
FIG. 5 depicts a flowchart of a process in accordance with disclosed embodiments.

FIG. 5 depicts a flowchart of a process in accordance with disclosed embodiments, and is described below with regard to other illustrative figures.

The system receives a model (step 505). The "system" can be PDM data processing system as described herein, and the model is 3D model including a plurality of components. "Receiving", as used herein, can include loading from storage, receiving from another device or process, or receiving via an interaction with a user. The model includes the geometries and parameters for each component that enable the characteristics of the components to be compared for the geometric relationships described herein.

The system can identify a plurality of target components to be examined for symmetry (step 510). This step can be performed in response to a user input, such as a command to find symmetric components, and can be performed on all members of a relationship class as described herein. This step can include receiving or creating a relationship graph that includes the target components.

Figure 6:
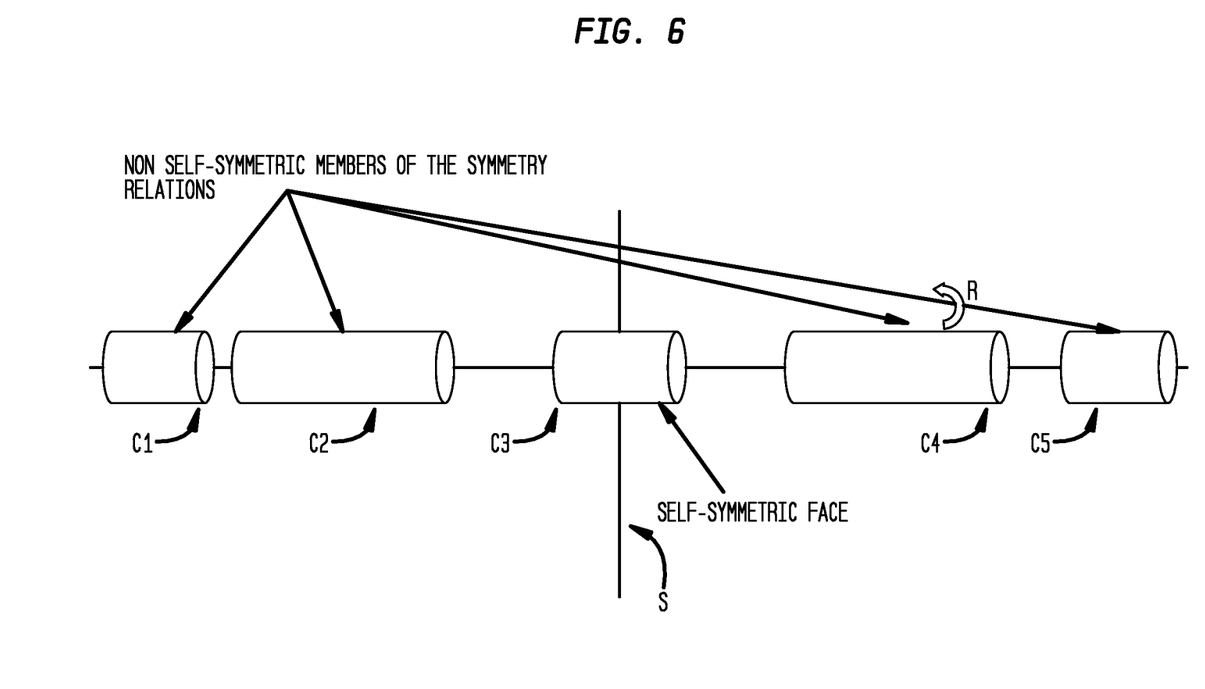
FIG. 6 illustrates an example of target components in a model, in accordance with disclosed embodiments.

FIG. 6 illustrates an example of target components in a model.

The system can identify a symmetry plane in the model (step 515). This step can be performed automatically by the system, or can include receiving a user selection of a symmetry plane. FIG. 6 shows a symmetry plane S and several cylinder faces C1-C5.

For each target components, the system can determine on which side of the symmetry plane the target lies (step 520). Any process for assigning the component's side can be used, such as but not limited to using a bounding box center or center of mass, using color or other engineering or design attributes, or otherwise. The target components can be, for example, a single model face when partitioning an Identical class, or a collection of model faces when partitioning higher level classes such as Same-axis or Same-direction, or otherwise.

Each target component is identified by location with respect to the symmetry plane, including components determined to lie in front of the symmetry plane; components determined to lie behind the symmetry plane; and components determined to lie on the symmetry plane. Of course, "in front" or "behind" are relative terms, and are intended to encompass equivalent determinations, whether "left" and "right", "above" and "below" or otherwise. For example, in FIG. 6, cylinders C1 and C2 are to the left of symmetry plane S, and cylinders C4 and C5 are to the right of symmetry plane S.

The system adds each of the target components to a group according to the identified location (step 525). If there are remaining target components, this process can loop to step 520. For example, cylinders C1 and C2 can be placed in a first group, and cylinders C4 and C5 can be placed in a second group. The respective groups include those target components on either side of the symmetry plane.

For each of the groups that are not empty, the system creates an equivalence class (step 530). A class can be created for the first group and for the second group. This step can include placing the new classes in the relationship graph.

The system creates a symmetry relationship between the two groups containing the symmetric components (step 532). The system can create a symmetry relationship between the first group and the second group.

The system stores the symmetry relationship (step 535). This can include storing the symmetry relationship in the relationship graph and can include storing the modified relationship graph.

In some embodiments, discovering and dealing with the symmetries in the Identical classes first acts as a trigger for repeating this process in higher level classes rather than having to re-discover the symmetries.

As noted in the above process, in some models the partitioning may conclude that the member is neither on one side nor the on other of the symmetry plane, which is referred to herein as "self-symmetric." FIG. 6 illustrates five cylinder faces that would be part of an Identical class; cylinder C3 is self-symmetric and can be placed into a third group.

This third group of faces (in the example of FIG. 6, the group only contains the single face C3) can be treated differently. Instead of being constrained to remain symmetric under movement, a different set of constraints can be applied depending on the type of surface involved. In this example, the following are applied, but of course other implementations could use other constraints:

Cylinder C3 is constrained to remain parallel to the symmetry plane.

Cylinder C3 has two optional constraints applied, one to remain coincident with the Identical class containing C1 and C2, and another to remain coincident to the Identical class containing C4 and C5. Optional means it cannot conflict with a user's requested movement or other constraints on the model.

In some implementations, for example, the system can apply constraints to keep the central geometry self-symmetric to the symmetry plane. In a cylinder case, for example, this can be a parallel between the cylinder axis and the symmetry plane normal. For a plane, this could be a perpendicular between the plane normal and the symmetry plane normal. Optional constraints can then be used to attempt keep the central geometry identical to the Identical classes on either side.

Figure 7:
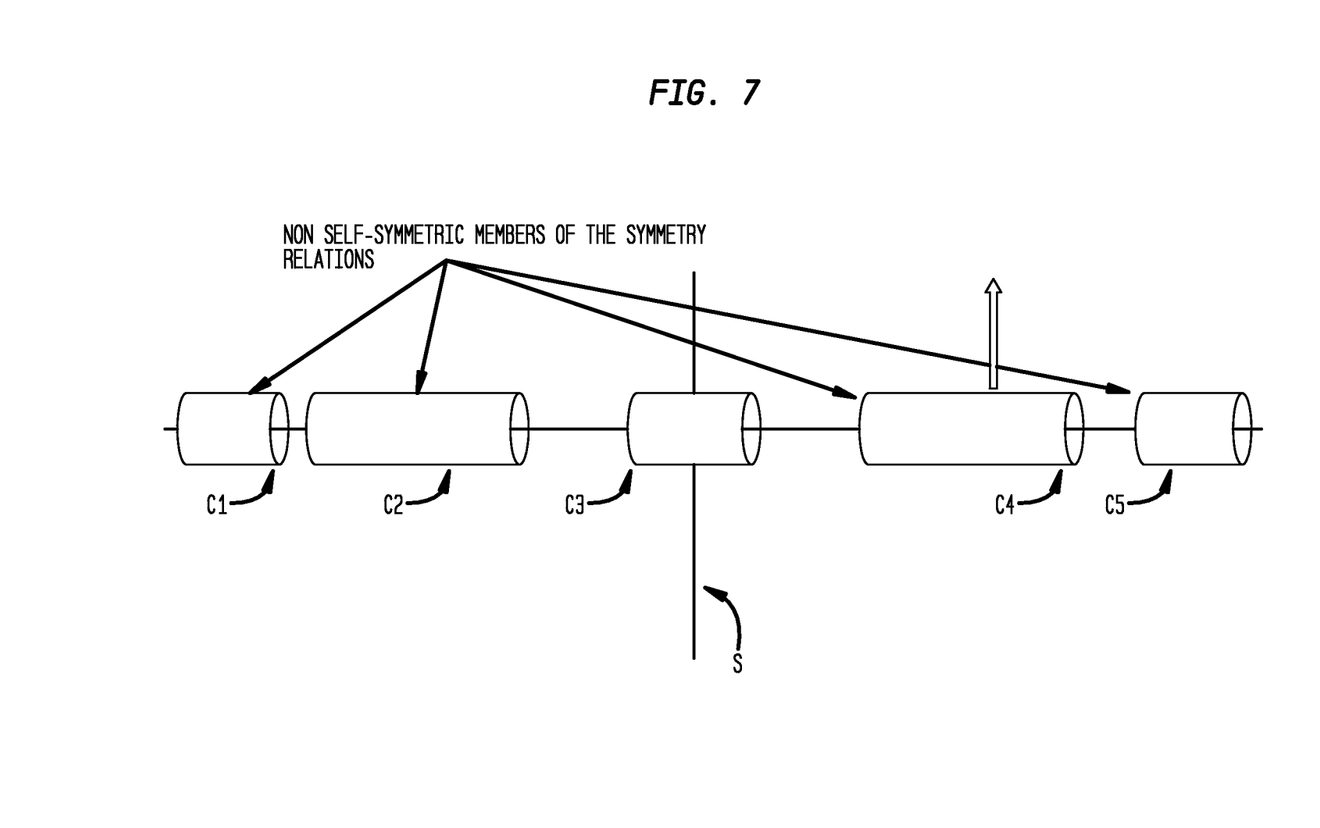
FIG. 7 illustrates the use of optional constraints when a component is moved and an optional constraint is maintained, in accordance with disclosed embodiments.

FIG. 7 illustrates the use of optional constraints when C4 is moved upwards and the optional constraint is maintained, using the same elements as in FIG. 6. As C4 is moved upwards, C5 is also moved upward as part of the second Identical class/group, C1 and C2 are moved upward as part of the first Identical class/group that is symmetrical with the second Identical class/group, and C3 is moved upward according to the optional constraints above.

Figure 8:
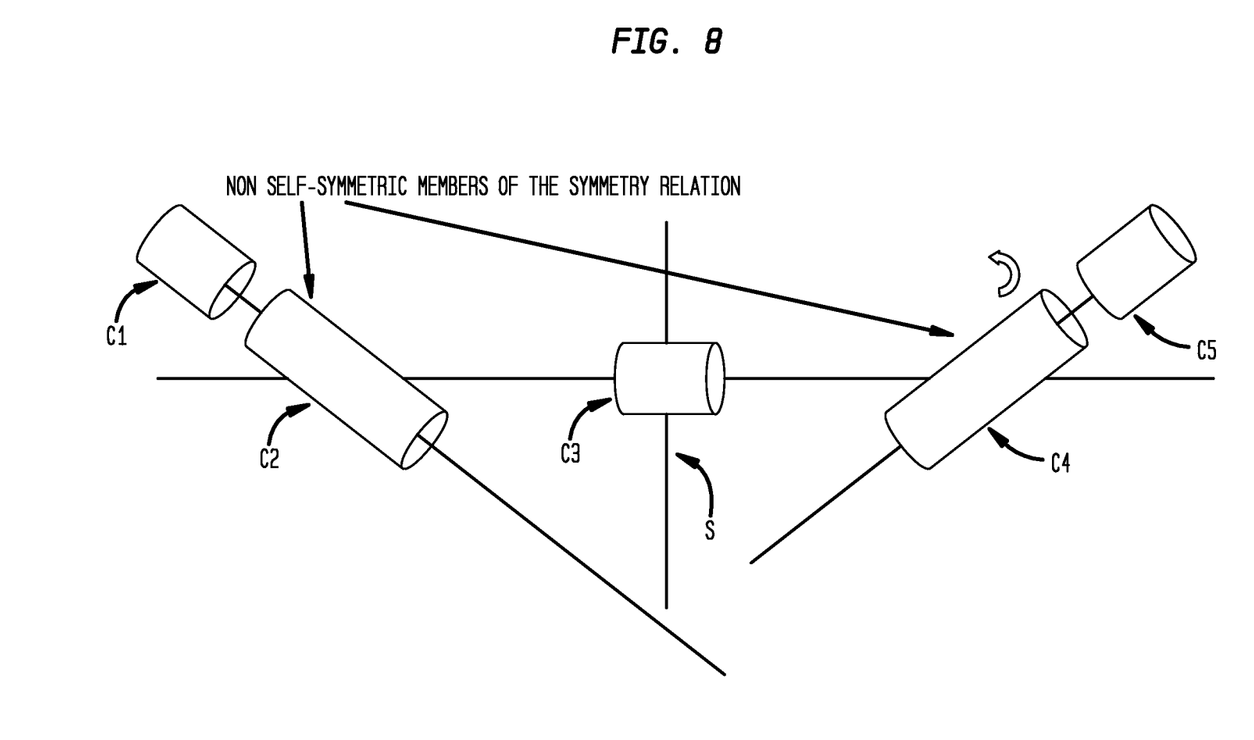
FIG. 8 illustrates the use of optional constraints when a component has its axis rotated.

FIG. 8 illustrates the use of optional constraints when C4 has its axis rotated, using the same elements as in FIG. 6. As C4 is rotated, C5 is also rotated as part of the second Identical class/group, C1 and C2 are rotated in the opposite direction as part of the first Identical class/group that is symmetrical with the second Identical class/group, and C3 remains stationary according to the optional constraints above.

The partitioning process described above can also be used to deal with multiple symmetry planes.

Figure 9:
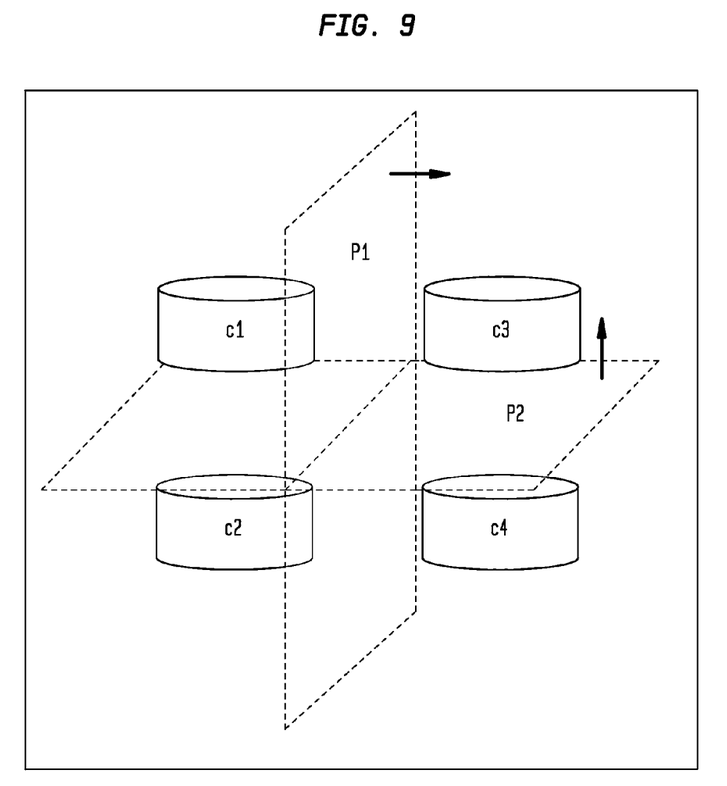
FIG. 9 shows an example of partitioning by multiple symmetry planes, in accordance with disclosed embodiments.

FIG. 9 shows an example of partitioning by multiple symmetry planes P1 and P2. In this example, C1, C2, C3 and C4 are all parallel and without symmetry and can all be members of a single Same-direction class (via two Same-axis classes and two Identical classes).

However to allow rotation of the axis of C1, this Same-direction class needs to be partitioned into four groups/classes and the appropriate symmetry relationships applied.

To accomplish this, the system can assign each component of a class a "sense" with respect to each symmetry plane to form a "signature." All members with the same signature then form a single partition. The sense is defined from which side of the plane the partitioning scheme decides the component is on. In front of the plane defined as positive, and behind the plane defined as negative. In the context of the process above, the target components can be grouped according to respective signatures defined by the sense of each target component.

Figure 10A:
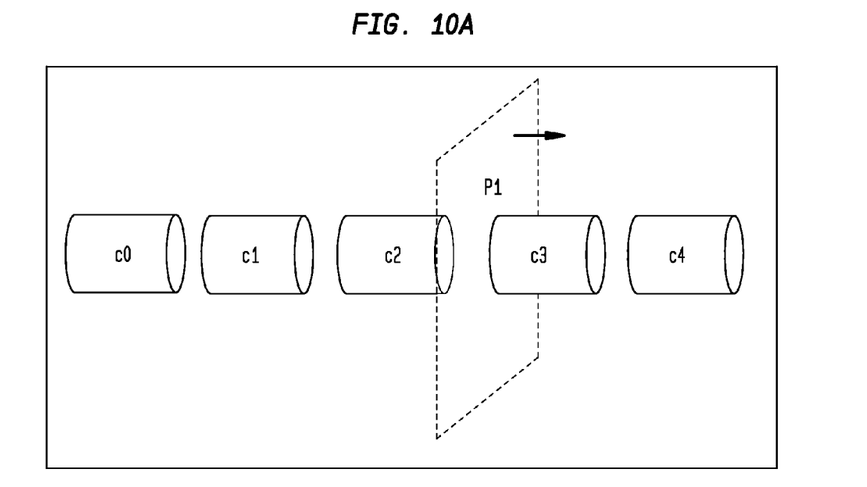
FIG. 10A illustrates an example of a single symmetry plane.
Figures 10B, 10C:
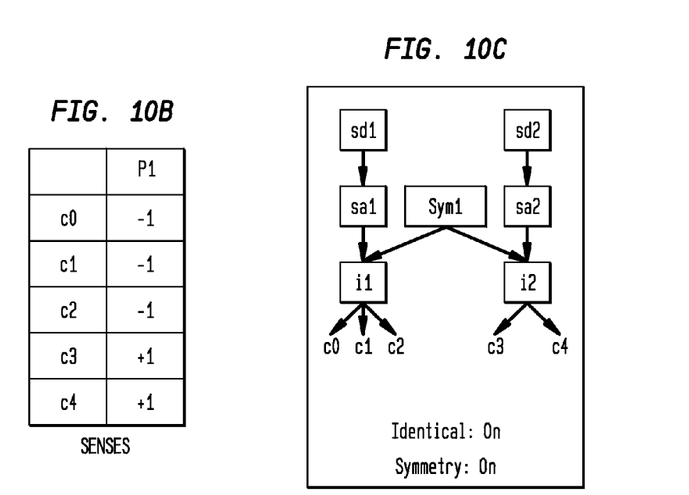
FIG. 10B shows the corresponding senses.
FIG. 10C illustrates a corresponding relationship graph, all in accordance with disclosed embodiments.

FIG. 10A illustrates an example of a single symmetry plane p1 for cylinder faces c0-c4. FIG. 10B shows the corresponding senses for these faces and plane, and FIG. 10C illustrates a corresponding relationship graph.

In this example, c1 and c4 are symmetric, c2 and c3 are symmetric, and all five cylinders are Identical. Faces c0, c1 and c2 have the same sense, and faces c3 and c4 have the same sense, as shown in FIG. 10B. Therefore, the group of Identical geometries is partitioned into two groups, and two Identical classes i1 and i2 are created, and a symmetry relation Sym1 is created between the Identical classes, as shown in FIG. 10C.

Figure 11A:
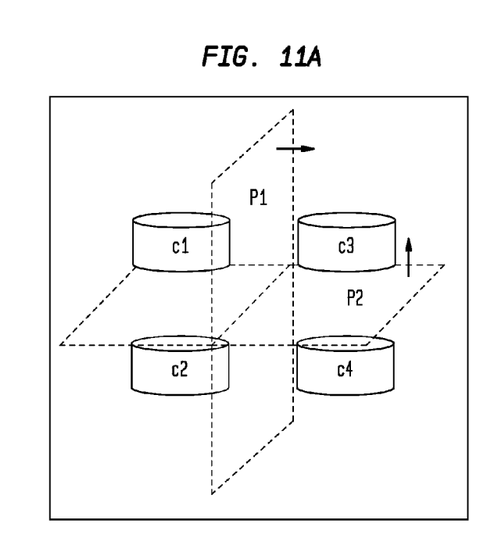
FIG. 11A illustrates an example of a two symmetry planes.
Figure 11B:
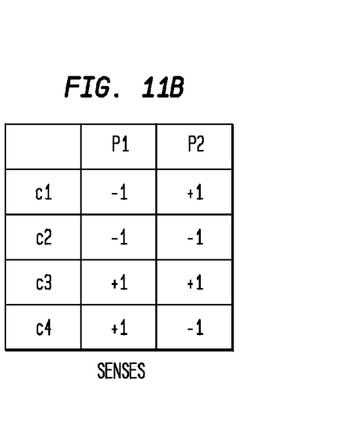
FIG. 11B shows the corresponding senses.
Figure 11C:
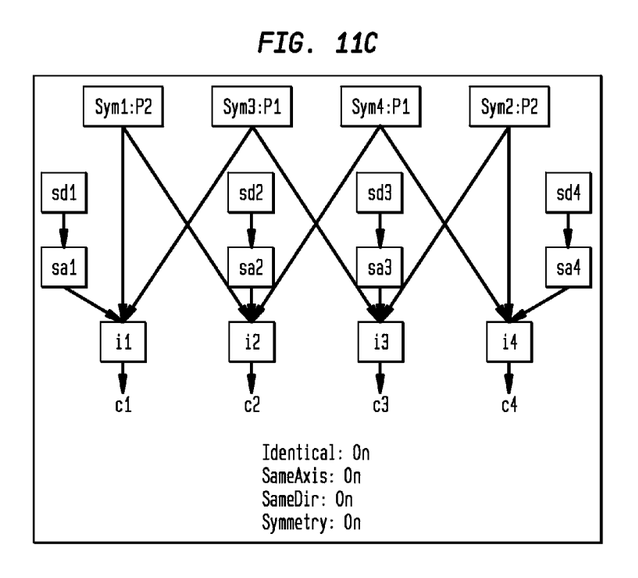
FIG. 11C illustrates a corresponding relationship graph, all in accordance with disclosed embodiments.

FIG. 11A illustrates an example of two symmetry planes P1 and P2 for cylinder faces c1-c4, corresponding to FIG. 9, above. FIG. 11B shows the corresponding senses for these faces and planes, and FIG. 11C illustrates a corresponding relationship graph.

In this example, the cylinders are symmetric about two different symmetry planes P1 and P2. When the senses about both planes are taken into account, as shown in FIG. 11B, all four cylinders have different signatures (defined by the combination of senses). Therefore four separate Identical, Same-axis and Same-direction classes are created, as shown in the relationship graph of FIG. 11C.

Of course, those of skill in the art will recognize that, unless specifically indicated or required by the sequence of operations, certain steps in the processes described above may be omitted, performed concurrently or sequentially, or performed in a different order. Steps and operations of the various processes can be combined in various embodiments.

Those skilled in the art will recognize that, for simplicity and clarity, the full structure and operation of all data processing systems suitable for use with the present disclosure is not being depicted or described herein. Instead, only so much of a data processing system as is unique to the present disclosure or necessary for an understanding of the present disclosure is depicted and described. The remainder of the construction and operation of data processing system 100 may conform to any of the various current implementations and practices known in the art.

It is important to note that while the disclosure includes a description in the context of a fully functional system, those skilled in the art will appreciate that at least portions of the mechanism of the present disclosure are capable of being distributed in the form of instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs).

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, or function is an essential element which must be included in the claim scope: the scope of patented subject matter is defined only by the allowed claims. Moreover, none of these claims are intended to invoke paragraph six of 35 USC §112 unless the exact words "means for" are followed by a participle.

What is claimed is:

1. A method for identifying symmetry relationships, comprising:
   receiving, in a product data management (PDM) system, a 3D model including a plurality of components;
   identifying, by the PDM system, a plurality of target components from the plurality of components;
   identifying, by the PDM system, a symmetry plane in the 3D model;
   determining, by the PDM system, the location of each of the target components with respect to the symmetry plane;
   adding, by the PDM system, the target components to respective groups according to the determined locations;
   creating, by the PDM system, an equivalence class for each group of target components; and
   storing, by the PDM system, a symmetry relationship between the created equivalence classes.

2. The method of claim 1, wherein the symmetry relationship is stored in a relationship graph.

3. The method of claim 1, wherein the respective groups include respective target components, of the plurality of target components, on either side of the symmetry plane.

4. The method of claim 1, wherein the created equivalence classes are stored in a relationship graph.

5. The method of claim 1, wherein the PDM system also identifies a target component that is not on either side of the symmetry plane, and adds that target component to a third group.

6. The method of claim 1, wherein the PDM system assigns each target component a sense with respect to the symmetry plane.

7. The method of claim 6, wherein the target components are grouped according to respective signatures defined by the sense of each target component.

8. A product data management (PDM) system comprising:
   at least one processor; and
   an accessible memory, the PDM system configured to:
     receive a 3D model including a plurality of components;
     identify a plurality of target components from the plurality of components;
     identify a symmetry plane in the 3D model;
     determine the location of each of the target components with respect to the symmetry plane;
     add the target components to respective groups according to the determined locations;
     create an equivalence class for each group of target components; and
     store a symmetry relationship between the created equivalence classes.

9. The PDM system of claim 8, wherein the symmetry relationship is stored in a relationship graph.

10. The PDM system of claim 8, wherein the respective groups include respective target components, of the plurality of target components, on either side of the symmetry plane.

11. The PDM system of claim 8, wherein the created equivalence classes are stored in a relationship graph.

12. The PDM system of claim 8, wherein the PDM system also identifies a target component that is not on either side of the symmetry plane, and adds that target component to a third group.

13. The PDM system of claim 8, wherein the PDM system assigns each target component a sense with respect to symmetry plane.

14. The PDM system of claim 13, wherein the target components are grouped according to respective signatures defined by the sense of each target component.

15. A non-transitory computer-readable medium encoded with computer-executable instructions that, when executed, cause a product data management (PDM) system to:
   receive a 3D model including a plurality of components;
   identify a plurality of target components from the plurality of components;
   identify a symmetry plane in the 3D model;
   determine the location of each of the target components with respect to the symmetry plane;
   add the target components to respective groups according to the determined locations;
   create an equivalence class for each group of target components; and
   store a symmetry relationship between the created equivalence classes.

16. The computer-readable medium of claim 15, wherein the symmetry relationship is stored in a relationship graph.

17. The computer-readable medium of claim 15, wherein the respective groups include respective target components, of the plurality of target components, on either side of the symmetry plane.

18. The computer-readable medium of claim 15, wherein the created equivalence classes are stored in a relationship graph.

19. The computer-readable medium of claim 15, wherein the PDM system also identifies a target component that is not on either side of the symmetry plane, and adds that target component to a third group.

20. The computer-readable medium of claim 15, wherein the PDM system assigns each target component a sense with respect to the symmetry plane, and wherein the target components are grouped according to respective signatures defined by the sense of each target component.

* * * * *